United States Patent
Kupfer et al.

(10) Patent No.: US 11,584,245 B2
(45) Date of Patent: Feb. 21, 2023

(54) CHARGING SOCKET FOR A POWER SUPPLY ARRANGEMENT, CORRESPONDING POWER SUPPLY ARRANGEMENT, AND METHOD FOR OPERATING A CHARGING SOCKET

(71) Applicant: AUDI AG, Ingolstadt (DE)

(72) Inventors: Alexander Kupfer, Mannheim (DE); Ilias Gkoumas, Nuremberg (DE); Hardo Tumm, Ingolstadt (DE)

(73) Assignee: Audi AG, Ingolstadt (DE)

( * ) Notice: Subject to any disclaimer, the term of this patent is extended or adjusted under 35 U.S.C. 154(b) by 134 days.

(21) Appl. No.: 17/030,192

(22) Filed: Sep. 23, 2020

(65) Prior Publication Data

US 2021/0086634 A1 Mar. 25, 2021

(30) Foreign Application Priority Data

Sep. 25, 2019 (DE) .......................... 102019125784.0

(51) Int. Cl.
*B60L 53/16* (2019.01)
*H01R 13/71* (2006.01)
*H01R 35/04* (2006.01)

(52) U.S. Cl.
CPC .............. *B60L 53/16* (2019.02); *H01R 13/71* (2013.01); *H01R 35/04* (2013.01)

(58) Field of Classification Search
CPC .......... B60L 53/16; H01R 13/71; H01R 35/04
USPC ....................................................... 320/109
See application file for complete search history.

(56) References Cited

U.S. PATENT DOCUMENTS 3,869,186 A * 3/1975 Vetter .................. H01R 13/621
439/321
4,066,315 A * 1/1978 Arneson .............. H01R 13/622
439/311

(Continued)

FOREIGN PATENT DOCUMENTS

CN 208849150 U * 5/2019 .............. B60L 53/14
CN 110380266 A * 10/2019

(Continued)

*Primary Examiner* — Suresh Memula
(74) *Attorney, Agent, or Firm* — Seed Intellectual Property Law Group LLP

(57) ABSTRACT

A charging socket for a power supply arrangement for supplying a motor vehicle with electrical energy via a conductive plug connection has at least one electrical mating contact for conductively contacting a contact of a charging station. The electrical mating contact is displaceably mounted with respect to a central longitudinal axis of the charging socket in the radial direction between a first mating contact position and a second mating contact position different from the first mating contact position, wherein the charging socket has an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position. A power supply arrangement and a method for operating a charging socket are also provided.

10 Claims, 1 Drawing Sheet

(56) References Cited

U.S. PATENT DOCUMENTS

| | | | | |
|---|---|---|---|---|
| 4,183,605 | A | * | 1/1980 | Arneson ............... H01R 13/622 439/311 |
| 4,277,125 | A | * | 7/1981 | Ball ..................... H01R 13/622 439/311 |
| 4,443,052 | A | * | 4/1984 | Eaby .................... H01R 13/622 439/680 |
| RE31,995 | E | * | 10/1985 | Ball ..................... H01R 13/622 439/313 |
| 4,547,032 | A | * | 10/1985 | Burns ................... H01R 13/625 439/314 |
| 7,182,615 | B1 | | 2/2007 | Liu |
| 9,039,436 | B2 | | 5/2015 | Tiberghien et al. |
| 9,666,973 | B1 | * | 5/2017 | Strahl .................. H01R 13/622 |
| 9,780,485 | B2 | * | 10/2017 | Troquet ............... H01R 13/508 |
| 9,825,404 | B2 | * | 11/2017 | Yoshigi ................ H01R 13/625 |
| 9,899,772 | B2 | * | 2/2018 | Tiberghien ........... H01R 13/625 |
| 10,574,006 | B2 | * | 2/2020 | Storione ............... H01R 35/04 |
| 11,081,838 | B2 | * | 8/2021 | Wendt .................. H01R 13/639 |
| 2010/0062633 | A1 | | 3/2010 | Puttinger et al. |
| 2011/0207340 | A1 | * | 8/2011 | Cairns .................. H01R 35/04 439/13 |
| 2014/0170879 | A1 | * | 6/2014 | Kahara ................. B60L 1/003 403/321 |
| 2018/0131130 | A1 | * | 5/2018 | Stucchi ................ H01R 13/642 |

FOREIGN PATENT DOCUMENTS

| | | | | |
|---|---|---|---|---|
| CN | 112242628 | A | * 1/2021 | ............. H01R 13/42 |
| CN | 112615226 | A | * 4/2021 | |
| CN | 113285319 | A | * 8/2021 | |
| CN | 113853716 | A | * 12/2021 | ............. B60L 53/16 |
| DE | 25 49 590 | A1 | 5/1976 | |
| DE | 19548543 | C1 | * 6/1997 | ............. H01R 13/74 |
| DE | 202011004090 | U1 | * 6/2011 | ............. F16L 37/138 |
| DE | 102010054462 | A1 | * 6/2012 | ......... B60L 11/1818 |
| DE | 10 2011 082 092 | A1 | 3/2013 | |
| DE | 102011083819 | A1 | * 4/2013 | ............. B60L 53/16 |
| DE | 10 2014 200 290 | A1 | 7/2015 | |
| DE | 102014101297 | A1 | * 8/2015 | ......... H01R 13/6275 |
| DE | 102017007947 | A1 | * 4/2018 | |
| DE | 102018208054 | A1 | * 11/2019 | |
| DE | 102019132390 | A1 | * 6/2021 | ............. B60L 53/16 |
| DE | 102020112332 | A1 | * 11/2021 | |
| EP | 3767750 | A1 | * 1/2021 | ............. H01R 13/42 |
| EP | 3869622 | A1 | * 8/2021 | |
| EP | 3869632 | A1 | * 8/2021 | |
| JP | 2011234444 | A | * 11/2011 | ......... B60L 11/1818 |
| KR | 102358509 | B1 | * 1/2020 | |
| WO | WO-2013044903 | A2 | * 4/2013 | |
| WO | WO-2013045329 | A2 | * 4/2013 | ......... B60L 11/1818 |
| WO | WO-2020233986 | A1 | * 11/2020 | ............. B60L 53/16 |
| WO | WO-2021223969 | A1 | * 11/2021 | ............. B60L 53/16 |

* cited by examiner

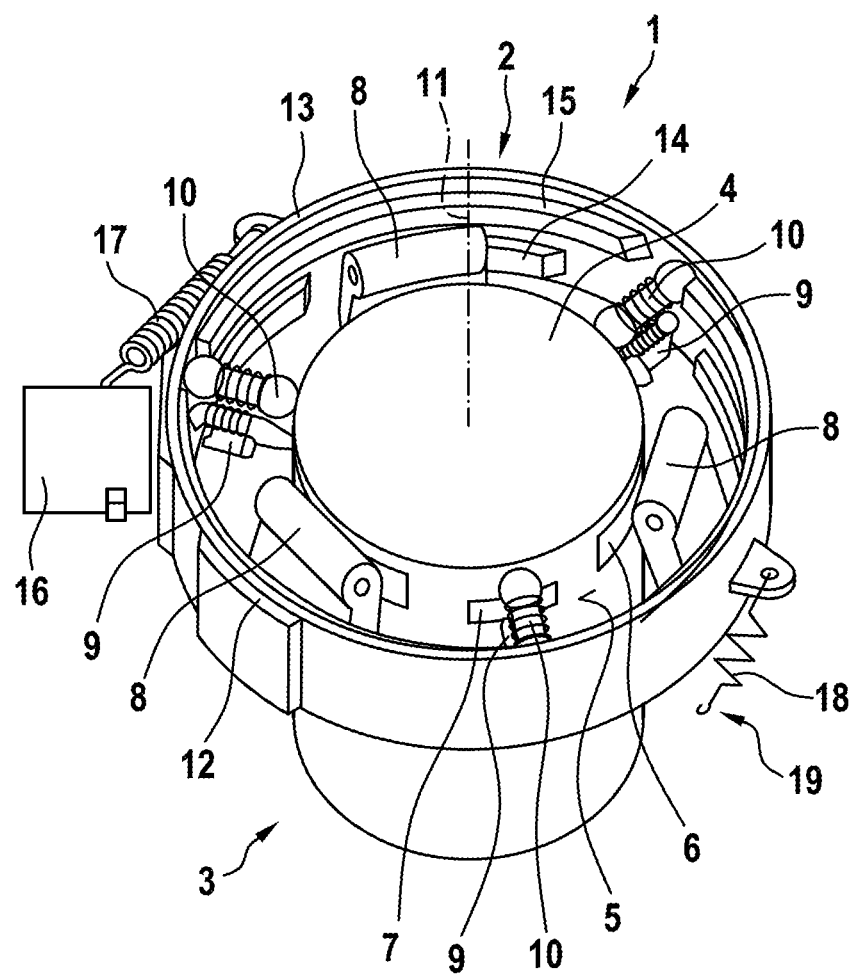

CHARGING SOCKET FOR A POWER SUPPLY ARRANGEMENT, CORRESPONDING POWER SUPPLY ARRANGEMENT, AND METHOD FOR OPERATING A CHARGING SOCKET

BACKGROUND

Technical Field

Embodiments of the invention relate to a charging socket for a power supply arrangement for supplying a motor vehicle with electrical energy via a conductive plug connection, having at least one electrical mating contact for conductively contacting a contact of a charging station. Embodiments of the invention also relate to a power supply arrangement and to a method for operating a charging socket.

Description of the Related Art

Publication DE 10 2014 200 290 A1, for example, is known from the prior art. This document describes a charging device, a charging system, and a method for charging a battery of a vehicle, and an electrical connecting device for charging a battery of the vehicle. The electric charging device comprises: a lifting device to which a charging head is coupled; wherein the charging head has a first plurality of first electrical contacts at or on a first surface of the charging head, which contacts can be connected at least in part to an energy source in order to charge the battery; and an actuator by means of which the lifting device can be actuated such that the charging head is movable at least partially into a first direction which is substantially orthogonal to the first surface; wherein the lifting device is furthermore aligned such that when thrust in the first direction onto a stop surface, the charging head is movable in a second direction along the stop surface by continued actuation of the lifting device by the actuator.

In addition, publication DE 10 2011 082 092 A1 describes a charging device for establishing and disconnecting in an automated manner a charging connection for a plug-in vehicle, wherein the charging device comprises the plug-in vehicle, charging electrics, a charging station, and a charging cable for charging an energy store of the vehicle via a cabled charging connection, the charging electrics comprises a socket and the charging cable comprises a plug, and the charging device is designed such that the socket has one or more insertion funnels, that the plug has one or more insertion pins, that each insertion pin is assigned to a certain insertion funnel, that information can be exchanged between the charging station and the charging electrics when the charging connection is established, that information can be exchanged between the charging station and the vehicle when the charging connection is not established, that the plug and a reinforcement section of the charging cable connected to the plug are movable by a guiding mechanism comprised by the charging station in a specified spatial direction in the form of a coupling movement over a maximally specified coupling length, and that the plug and a reinforcement section of the charging cable connected to the plug are movable over the coupling length by a guiding mechanism comprised by the charging station in a spatial direction opposite the specified spatial direction in the form of a decoupling movement.

Publication U.S. Pat. No. 9,039,436 B2 in addition discloses an electrical connector with automatic engagement.

BRIEF SUMMARY

The object of embodiments of the invention is to provide a charging socket for a power supply arrangement, which charging socket has advantages over known charging sockets, in particular enables the conductive plug connection to be established in a permanently reliable manner.

This is achieved by a charging socket having the features described herein. In this case, it is provided that the electrical mating contact is displaceably mounted with respect to a central longitudinal axis of the charging socket in the radial direction between a first mating contact position and a second mating contact position different from the first mating contact position, wherein the charging socket has an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position.

The charging socket may be a component of the power supply arrangement. The power supply arrangement serves to supply electrical energy to the motor vehicle. The electrical energy is used, for example, to operate an energy consumer of the motor vehicle. The energy consumer is present, for example, in the form of an energy store of the motor vehicle, which energy store serves to store electrical energy temporarily. The energy store may be designed as a traction battery, i.e., as an energy store for a traction drive of the motor vehicle, by means of which traction drive a drive torque aimed at driving the motor vehicle can be provided or is at least provided from time to time.

The power supply arrangement may have a stationary charging station remote from the motor vehicle and the charging socket on board the motor vehicle. The charging station is connected, such as permanently connected, to an energy source or power source. At least temporarily, the electrical energy provided by the energy source is transmitted via the charging station to the charging socket and is thus provided to the motor vehicle via the charging socket, for example for operating the energy consumer, in particular charging the energy store. The charging station may be substantially stationary; for example, it is at least partially and/or at least temporarily accommodated in ground on which the motor vehicle is arranged.

The charging station and the charging socket serve to establish the conductive plug connection. Within the framework of the conductive plug connection, the electrical energy is continuously, transmitted conductively from the charging station to the motor vehicle or the charging socket. For this purpose, the charging station has the charging plug, which can be introduced into the charging socket in order to establish the conductive plug connection. The charging plug can be extended in the direction of the motor vehicle. This means that the charging plug can be arranged in at least two different positions. For example, it is arranged in a first position away from the charging socket, whereas in a second position, it abuts on or engages in the charging socket in order to establish the conductive plug connection.

The charging plug may be completely accommodated in the ground in the first position. For example, in the first position, an upper side of the charging plug facing the motor vehicle is arranged flush with the ground and/or a cover of the charging station. This means that, in its first position, the charging plug does not protrude beyond the ground or the cover but is flush with the ground or the cover. In this way, the charging plug is reliably protected from external influences. The cover is present, for example, in the form of a bottom plate of the charging station, wherein the bottom plate may be flush with the ground.

The charging plug may have a cylindrical base body which has an end face facing the motor vehicle and corresponding to the upper side facing the motor vehicle, and a lateral surface. The end face is completely surrounded by the lateral surface in the circumferential direction with respect to a central longitudinal axis of the cylindrical base body. Basically, the base body may be arbitrarily cylindrical. However, it may be circular-cylindrical, i.e., it has a round end face, from which the lateral surface extends with a likewise round cross-section.

The charging plug has the at least one electrical contact for establishing the conductive plug connection. The electrical contact is in conductive electrical connection with the electrical mating contact of the charging socket in at least one position of the charging plug and corresponding arrangement of the motor vehicle or of the charging socket. In this position, the conductive plug connection is thus present between the charging plug and the charging socket and thus between the energy source and the energy consumer, such as the energy store, via the at least one electrical mating contact and the electrical contact in conductive connection with the electrical mating contact.

The electrical contact is arranged on the lateral surface of the charging plug or of the base body. In some embodiments, no electrical contact is present on the end face of the charging plug so that the electrical contact is exclusively arranged at or on the lateral surface. If a plurality of electrical contacts are present on the charging plug, they may be arranged and distributed, in particular distributed uniformly, in the circumferential direction over the circumference of the base body. Additionally or alternatively, it may be provided that the electrical contacts are aligned with one another in the axial direction with respect to the central longitudinal axis, overlay one another, adjoin one another, or are arranged at a distance from one another.

In principle, any desired distribution of the electrical contacts on the lateral surface is thus permissible as long as the electrical contacts are arranged such that they are in conductive electrical connection with the electrical mating contacts according to the intended arrangement of the charging plug in the charging socket. In some embodiments, in each case at least one electrical mating contact of the charging socket is assigned to each of the electrical contacts, in particular precisely one electrical mating contact, and vice versa. After the charging plug has been introduced into the charging socket, each of the electrical contacts is thus in conductive connection with in each case at least one of the electrical mating contacts, in particular with precisely one of the electrical mating contacts.

In order to enable the conductive plug connection to be permanently reliably established, the base body may be surrounded by a guard ring which is arranged and/or mounted displaceably on the cylindrical base body. The guard ring can thus be arranged in different positions, namely at least in a first position and in a second position. In the first position, the guard ring surrounds the base body such that it completely covers the at least one contact, i.e., overlays it and completely overlaps it. In contrast, in the second position, the guard ring releases the electrical contact so that it can establish a conductive electrical connection with the mating contact of the charging socket.

The guard ring may be designed and/or arranged or mounted on the base body such that an end face of the guard ring is aligned in the first position with the end face of the base body. This means that, in the described first position of the charging plug, not only the end face of the base body or its upper side but additionally also the end face of the guard ring is aligned with the ground or with the cover of the charging station. Reliable protection of the electrical contact from external influences is thereby implemented.

In addition, during its displacement between the first position and the second position or vice versa, the guard ring may run over the electrical contact so that the guard ring causes a cleaning of the electrical contact. For example, the guard ring has, for this purpose, a cleaning device, in particular in the form of a cleaning brush or the like, facing the mechanical contact. This cleaning device is arranged such that, upon displacement of the guard ring between the first position and the second position or vice versa, it moves over the electrical contact in a cleaning manner.

Before inserting the charging plug into the charging socket, it is necessary to displace the guard ring from its first position into the second position in order to enable a conductive plug connection to be established, i.e., the establishment of an electrical connection between the electrical contact and the electrical mating contact. It may be provided that the displacement of the guard ring from the first position into the second position is carried out during the extension of the charging plug, i.e., simultaneously therewith. In this case, it may be provided that the guard ring is already carried out at the beginning of the extension of the charging plug or at least before the charging socket is reached by the charging plug.

In some embodiments, however, the guard ring is only displaced from the first position into its second position when the charging socket is reached by the charging plug, in particular while the guard ring abuts on the charging socket. As a result, soiling of the electrical contact is prevented particularly effectively because the abutment of the guard ring on the charging socket implements reliable protection of the electrical contact from external influences.

For example, it is provided to effect displacement of the guard ring by the abutment of the guard ring on the charging socket and the simultaneous extension of the charging plug. For this purpose, the charging socket has an abutment ring for the guard ring, which abutment ring surrounds a plug receptacle of the charging socket in the circumferential direction. During the extension of the charging plug, the guard ring comes into abutting contact with the abutment ring. When the charging plug is extended further in the direction of the charging socket, the guard ring is pushed from its first position into its second position, while the contact is at the same time inserted into the plug receptacle.

Accordingly, an encapsulation of the electrical contact with respect to the surrounding environment is always achieved by means of the guard ring. In such an embodiment, it is also possible to dispense with a separate drive for displacing the guard ring, although such a drive may of course be provided, for example in the form of an electromotive or an electromagnetic actuating drive.

In order to achieve a reliable conductive contacting between the contact of the charging station and the mating contact of the charging socket, a reliable compensation for any tolerances between the charging plug and the charging socket is required. For this purpose, the electrical mating contact is displaceable or displaceably mounted in the radial direction with respect to the central longitudinal axis of the charging socket. The mounting of the electrical mating contact is provided and designed such that the mating contact is displaceable between the first mating contact position and the second mating contact position.

For example, in the first mating contact position, the electrical mating contact is arranged further outside than in the second mating contact position when viewed in the radial direction with respect to the central longitudinal axis. In the first mating contact position, the mating contact may be present at a distance from the charging plug or its contact, whereas in the second mating contact position, it abuts on the charging plug or the contact of the charging plug. If a plurality of mating contacts are provided, they may be arranged and distributed, in particular distributed uniformly, in the circumferential direction around the central longitudinal axis of the charging socket.

In the first mating contact position, the mating contacts each have a distance from the central longitudinal axis which is greater than a radius of the charging plug or of the cylindrical base body of the charging plug. In contrast, in the second mating contact point, the distance of the mating contacts from the central longitudinal axis corresponds in each case to the radius of the charging plug or of the base body so that the mating contacts ultimately electrically conductively abut on the charging plug or contacts of the charging plug.

The charging socket furthermore has the adjusting ring, which is rotatably mounted about the central longitudinal axis. The central longitudinal axis may thus also be referred to as an axis of rotation. The adjusting ring has the at least one adjustment ramp which serves to displace the mating contact in the radial direction. If the adjusting ring is in its first angular position, the adjustment ramp permits the displacement of the mating contact into the first mating contact position, in particular in that it is further away from the central longitudinal axis in the region of the mating contact than in the second angular position. In the second angular position, however, the adjustment ramp pushes the electrical mating contact into the second mating contact position, i.e., toward the central longitudinal axis and/or the charging plug. Reliable tolerance compensation between the contact and the mating contact is implemented by such a development of the charging socket.

A further development provides that the adjusting ring is mechanically coupled to an actuator which is provided and designed for displacing the adjusting ring between the first angular position and the second angular position, and/or that the adjusting ring is mechanically coupled to a restoring device which pushes the adjusting ring in the direction of the first angular position. For example, the actuator serves for the purposeful displacement of the adjusting ring into the second angular position. When the actuator is actuated, it thus displaces, for example, the adjusting ring out of the first angular position and in the direction of the second angular position or into the latter. The actuator is present, for example, in the form of an electromotive actuator or an electromagnetic actuator.

The actuator may be designed such that it exerts an adjusting force on the adjusting ring for its displacement only as long as it is actuated accordingly. If there is no actuation, i.e., if the actuator is no longer energized, for example, the actuator will permit a displacement of the adjusting ring, in particular a displacement out of the second angular position and/or in the direction of the first angular position. In other words, if the actuator is not actuated or energized, it will provide neither an adjusting force nor a holding force, preventing a displacement of the adjusting ring, on the adjusting ring.

Additionally or alternatively, the restoring device is provided. This restoring device is mechanically coupled to the adjusting ring and, in some embodiments permanently, pushes the adjusting ring in the direction of, such as into, the first angular position. For this purpose, the restoring device has, for example, a spring element which, at least after a displacement of the adjusting ring out of the first angular position, brings about an adjusting force on the adjusting ring, which pushes the latter in the direction of the first angular position. However, it may also be provided that the spring element is preloaded so that it already brings about an adjusting force or a restoring force on the adjusting ring in the first angular position of the adjusting ring, which force pushes the adjusting ring in the direction of the first angular position and is therefore aimed at holding the adjusting ring in the first angular position. Such a development enables the conductive contacting to be rapidly and reliably established and/or disconnected.

A development provides that the charging socket has a locking element which is displaceably mounted with respect to the central longitudinal axis in the radial direction between a first locking element position and a second locking element position different from the first locking element position, wherein the adjusting ring has a locking element adjustment ramp which, in the first angular position, permits a displacement of the locking element into the first locking element position and, in the second angular position, pushes the locking element into the second locking element position. In this respect, the statements made for the electrical mating contact apply analogously to the locking element.

However, the locking element does not serve for the conductive contacting but for fixing the charging plug in the charging socket, in particular in the radial direction and/or in the axial direction. A plurality of locking elements may be present, which are arranged and distributed, in particular distributed uniformly, in the circumferential direction with respect to the central longitudinal axis. For example, at least three locking elements are provided in order to enable the charging plug to be centered in the charging socket by means of the locking elements. The locking element is displaced analogously to the displacement of the mating contact by means of the locking element adjustment ramp.

It may be provided that, by means of the locking element or the plurality of locking elements, the charging plug is only centered in the charging socket in the radial direction with respect to the central longitudinal axis. For this purpose, the locking elements in the second locking element position abut on an outer circumference of the charging plug or of the cylindrical base body of the charging plug and push the charging plug into a centered position. For example, the locking element or the locking elements each have a spring element which causes a spring action on the charging plug in the direction of the central longitudinal axis so that a resilient centering of the charging plug in the charging socket is achieved by means of the locking element or the locking elements.

Additionally or alternatively, the locking element can fix the charging plug in the charging socket in the axial direction with respect to the central longitudinal axis. For this purpose, the locking element may engage positively into a recess of the charging plug so that the charging plug is positively fixed with respect to the locking element and consequently to the charging socket as long as the locking element is in the second locking element position. In contrast, in the first locking element position, the locking element is out of engagement with this recess so that the charging plug is displaceable with respect to the charging socket. The described development of the charging socket enables the charging plug to be reliably fixed with respect to the charging socket.

In a further development, it may be provided that a preload is applied to the charging plug after its introduction into the charging socket, namely a preload in the direction facing away from the charging socket. In other words, after being arranged in its second position, i.e., in the charging socket, and after locking by means of the locking element, the charging socket is preloaded in the direction of its first position. For this purpose, the charging plug is displaceable, for example, by means of an elastic element, in particular a preloading spring. The described preload causes the charging plug to be pulled out of the charging socket when released by the at least one locking element, even if a fault or a power failure occurs.

A development provides that the electrical mating contact is present as an energy transmission mating contact and the charging socket additionally has at least one signal transmission mating contact which is displaceably mounted with respect to the central longitudinal axis in the radial direction between a first signal transmission mating contact position and one from the first signal transmission mating contact position, wherein the adjusting ring has a signal transmission mating contact adjustment ramp which, in the first angular position, permits a displacement of the signal transmission mating contact into the first signal transmission mating contact position and, in the second angular position, pushes the signal transmission mating contact into the second signal transmission mating contact position. In order to avoid repetitions, with regard to the signal transmission mating contact reference is made to the statements relating to the electrical mating contact. The development and the displacement are effected analogously.

The energy transmission mating contact serves to transmit electrical energy at a higher power than the signal transmission mating contact. For example, the electrical power transmittable by means of the energy transmission mating contact is at least 10, at least 100, or at least 1000 times greater than the electrical power transmittable by means of the signal transmission mating contact. The conductive plug connection for supplying the motor vehicle with electrical energy, i.e., ultimately the electrical connection between the charging station and/or the energy source on the one hand and the energy consumer of the motor vehicle on the other, may be established via the energy transmission mating contact.

The signal transmission mating contact, however, may serve only to detect a properly established conductive plug connection. In some embodiments, provision is made for the energy transmission contact to be completely electrically separated from the energy source and/or for the energy transmission mating contact to be completely electrically separated from the energy consumer until the signal transmission mating contact indicates that the conductive plug connection has been properly established. Only then will the electrical connection be established between the energy transmission contact and the energy source and/or between the energy transmission mating contact and the energy consumer established so that the motor vehicle or the energy consumer is supplied with electrical energy via the energy transmission mating contact. This in turn implements reliable establishment of the conductive contacting.

A development provides that the electrical mating contact and/or the signal transmission mating contact and/or the locking element are each acted upon by a spring force acting in the direction of the first mating contact position, signal transmission mating contact position, or locking element position. The spring force acting in each case thus pushes the electrical mating contact in the direction of the first mating contact position, the signal transmission mating contact in the direction of the first signal transmission mating contact position, and/or the locking element in the direction of the first locking element position. The spring force may thus also be referred to as a restoring force, which counteracts the adjusting force exerted by the adjusting ring on the mating contact, on the signal transmission mating contact, or on the locking element. This ensures that the conductive contacting can always be reliably released as soon as the adjusting ring is displaced out of the second angular position in the direction of the first angular position.

A development provides that the signal transmission mating contact is mechanically coupled to the locking element such that when the locking element is displaced out of the second locking element position, the signal transmission mating contact is pushed out of the second signal transmission mating contact position. This ensures that external mechanical influences on the locking element act at the same time on the signal transmission mating contact. If, for example, the locking element is displaced due to external influences, the signal transmission mating contact will be pushed out of the second signal transmission mating contact position so that an electrical contacting between the signal transmission mating contact and a signal transmission contact of the charging plug is interrupted.

If such an interruption is detected, an energy transmission between the charging station and the motor vehicle may be interrupted, in particular by interrupting the electrical connection between the energy source and the charging plug and/or the energy consumer and the charging socket. A high level of safety is thereby achieved. The external influences may occur, for example, due to a shifting of the motor vehicle, for example in the event of a collision accident or due to a shifting of the vehicle by rescue workers or the like.

A development provides that, in the first angular position, the adjustment ramp has a first distance in the circumferential direction away from the electrical mating contact and/or the signal transmission mating contact adjustment ramp has a second distance in the circumferential direction away from the signal transmission mating contact and/or the locking element adjustment ramp has a third distance in the circumferential direction away from the locking element, wherein the first distance is shorter than the second distance and/or the third distance is shorter than the first distance and/or the second distance. This means that when the adjusting ring is displaced out of the first angular position in the direction of the second angular position, the mating contact, the signal transmission mating contact, and the locking element will be displaced in the radial direction at different angular positions of the adjusting ring.

For example, it is provided that, during the displacement of the adjusting ring, first the locking element, then the mating contact, and finally the signal transmission mating contact are displaced so that first the charging plug is fixed by means of the locking element, then the mating contact comes into abutting contact with the electrical contact of the charging plug, and finally the electrical connection is established between the signal transmission mating contact and the signal transmission contact of the charging plug, spaced apart in time in each case.

If the adjusting ring is displaced out of the second angular position in the direction of the first angular position, the reverse sequence may be provided. Accordingly, the signal transmission mating contact is first removed from the signal transmission contact, then the mating contact is removed from the contact, and finally the locking of the charging plug by means of the locking element is released. This is brought about by an appropriate selection of the distances or by a corresponding design of the adjustment ramp, of the signal transmission mating contact adjustment ramp, and of the locking element adjustment ramp. This achieves a high level of safety of the charging socket or of the power supply arrangement.

A development provides an electrical changeover switch which electrically decouples the actuator from an on-board electrical system of the motor vehicle when the second angular position is reached and electrically connects it to the electrical mating contact and/or the signal transmission mating contact so that the actuator is supplied via the latter with electrical current for holding the adjusting ring in the second angular position. In any case, after switching, the actuator is only to be actuated for holding the adjusting ring in the second angular position as long as the mating contact is in electrical connection with the contact and/or the signal transmission mating contact is in electrical connection with the signal transmission contact.

If one of the electrical connections is not present, the actuator is no longer to be supplied with electrical current and correspondingly is no longer to hold the adjusting ring in the second angular position. The latter can thus be displaced out of the second angular position in the direction of the first angular position, for example by means of the restoring device. The changeover switch serves, for example, to first actuate the actuator for displacing the adjusting ring out of the first angular position in the direction of the second angular position in the direction of the second angular position with electrical energy originating, for example, from an on-board electrical system of the motor vehicle, in particular from the energy store.

After reaching the second regulating position, the changeover switch decouples the actuator from the on-board electrical system or the energy store and connects it to the mating contact or the signal transmission mating contact. In other words, as of now the actuator is actuated with electrical energy which is transmitted via the mating contact or the signal transmission mating contact. If this energy is not present, the adjusting ring will be released by the actuator. A high level of safety is thereby achieved.

Embodiments of the invention also relate to a power supply arrangement for supplying a motor vehicle with electrical energy via a conductive plug connection, having a stationary charging station and a charging socket arranged on board the motor vehicle, in particular a charging socket as described herein, wherein the charging socket has at least one electrical mating contact for conductively contacting a contact of the charging station and the charging station has a charging plug extendable in the direction of the motor vehicle.

In this case, it is provided that the electrical mating contact is displaceably mounted in relation to a central longitudinal axis of the charging socket in the radial direction between a first mating contact position and a second mating contact position different from the first mating contact position, wherein the charging socket has an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position.

The advantages of such a design of the power supply arrangement or of the charging socket have already been pointed out. Both the power supply arrangement and the charging socket may be developed in accordance with the explanations within the context of this description so that reference is made in this respect to the latter.

Embodiments of the invention also relate to a method for operating a charging socket for a power supply arrangement for supplying a motor vehicle with electrical energy via a conductive plug connection, in particular a charging socket, according to the explanations within the context of this description, wherein the charging socket has at least one electrical mating contact for conductively contacting a contact of a charging station.

In this case, it is provided that the electrical mating contact is displaceably mounted with respect to a central longitudinal axis of the charging socket in the radial direction between a first mating contact position and a second mating contact position different from the first mating contact position, wherein the charging socket has an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position, and wherein the electrical mating contact is displaced in the direction of the second mating contact position in order to establish the conductive contacting of the contact by displacing the adjusting ring in the direction of the second angular position.

Reference is again made to the advantages and possible developments of the charging socket, of the power supply arrangement, and also of the method to the explanations within the context of this description.

BRIEF DESCRIPTION OF THE SEVERAL VIEWS OF THE DRAWINGS

Embodiments of the invention are explained in more detail below with reference to the drawing, without any limitation of the invention ensuing.

The FIGURE is a schematic representation of a charging socket and of a charging plug arranged therein of a power supply arrangement.

DETAILED DESCRIPTION

The FIGURE shows a schematic representation of a region of a power supply arrangement 1 which has a charging socket 2 and a charging plug 3. The charging plug 3 has a cylindrical base body 4, on the lateral surface 5 of which at least one electrical contact 6 and a signal transmission contact 7 are arranged. In the exemplary embodiment shown here, both a plurality of contacts 6 and a plurality of signal transmission contacts 7 are present. The contacts 6 are designed as energy transmission contacts.

The charging socket 2 has at least one electrical mating contact 8, at least one signal transmission mating contact 9, and at least one locking element 10. In the exemplary embodiment shown here, a plurality of mating contacts 8, a plurality of signal transmission mating contacts 9, and a plurality of locking elements 10 are provided and formed.

The mating contact 8 is present in the form of an energy transmission mating contact. The mating contact serves to contact the contact 6, and the signal transmission mating contact 9 serves to contact the signal transmission contact 7. In contrast, the locking element 10 is provided and designed to lock and center the charging plug 3 in the charging socket 2.

The mating contact 8, the signal transmission mating contact 9, and the locking element 10 are each displaceably mounted in the radial direction with respect to a central longitudinal axis 11. The mating contact 8 is displaceable between a first mating contact position and a second mating contact position, the signal transmission mating contact 9 is displaceable between a first signal transmission mating contact position and a second signal transmission mating contact position, and the locking element 10 is displaceable between a first locking element position and a second locking element position.

A displacement of the mating contact 8, of the signal transmission mating contact 9, and of the locking element 10 is brought about by means of an adjusting ring 12 which has at least one adjustment ramp 13 for displacing the mating contact 8, one signal transmission mating contact adjustment ramp 14 for displacing the signal transmission mating contact 9, and one locking element adjustment ramp 15 for displacing the locking element 10. Such an adjustment ramp 13 may be assigned to each mating contact 8, such a signal transmission mating contact adjustment ramp 14 may be assigned to each signal transmission mating contact 9, and such a locking element adjustment ramp 15 may be assigned to each locking element 10, or such an adjustment ramp is in each case formed on the adjusting ring 12.

In order to apply the respective adjustment ramp 13, 14, or 15 to the mating contact 8, the signal transmission mating contact 9, and the locking element 10, the adjusting ring 12 is rotatably mounted about the central longitudinal axis 11 which may thus also be referred to as an axis of rotation. The displacement of the adjusting ring 12 between a first angular position and a second angular position is brought about by means of an actuator 16 which is mechanically coupled to the adjusting ring 12, such as elastically by a spring element 17. Spaced apart from the actuator 16 or the spring element 17, a further spring element 18 engages in the adjusting ring 12. This spring element is a component of a restoring device 19 which applies a restoring force to the adjusting ring 12 by means of the spring element 18, which force pushes the adjusting ring 12 in the direction of the first angular position.

With the described design of the charging socket 2, a reliable contacting between the contact 6 and the mating contact 8 is ensured. In particular, a tolerance compensation between the charging plug 3 and the charging socket 2 is implemented by means of the charging socket 2.

German patent application no. 10 2019 125 784.0, filed Sep. 25, 2019, to which this application claims priority, is hereby incorporated by reference in its entirety.

Aspects and features various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A charging socket for a power supply arrangement for supplying a motor vehicle with electrical energy via a conductive plug connection, comprising:
    at least one electrical mating contact for conductively contacting a contact of a charging station, wherein the electrical mating contact is displaceably mounted with respect to a central longitudinal axis of the charging socket in the radial direction between a first mating contact position and a second mating contact position different from the first mating contact position; and
    an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position, and
    wherein, when the at least one electrical mating contact is in the second mating contact position, the at least one electrical mating contact and the contact of the charging station are configured to conduct electrical energy from the charging station to the charging socket.

2. The charging socket according to claim 1, wherein the adjusting ring is mechanically coupled to an actuator which is provided and designed to displace the adjusting ring between the first angular position and the second angular position, and/or the adjusting ring is mechanically coupled to a restoring device which pushes the adjusting ring in the direction of the first angular position.

3. The charging socket according to claim 1, wherein the charging socket has a locking element which is displaceably mounted with respect to the central longitudinal axis in the radial direction between a first locking element position and a second locking element position different from the first locking element position, wherein the adjusting ring has a locking element adjustment ramp which, in the first angular position, permits a displacement of the locking element into the first locking element position and, in the second angular position, pushes the locking element into the second locking element position.

4. The charging socket according to claim 3, wherein the electrical mating contact is present as an energy transmission mating contact and the charging socket additionally has at least one signal transmission mating contact which is displaceably mounted with respect to the central longitudinal axis in the radial direction between a first signal transmission mating contact position and a second signal transmission mating contact position different from the first signal transmission mating contact position, wherein the adjusting ring has a signal transmission mating contact adjustment ramp which, in the first angular position, permits a displacement of the signal transmission mating contact into the first signal transmission mating contact position and, in the second angular position, pushes the signal transmission mating contact into the second signal transmission mating contact position.

5. The charging socket according to claim 4, wherein the electrical mating contact, the signal transmission mating contact, and the locking element are acted upon by respective spring forces acting in the direction of the first mating contact position, signal transmission mating contact position, and locking element position, respectively.

6. The charging socket according to claim 3, wherein the signal transmission mating contact is mechanically coupled to the locking element such that when the locking element is displaced out of the second locking element position, the signal transmission mating contact is pushed out of the second signal transmission mating contact position.

7. The charging socket according to claim 4, wherein, in the first angular position, the adjustment ramp has a first distance in the circumferential direction from the electrical mating contact, the signal transmission mating contact adjustment ramp has a second distance in the circumferential direction from the signal transmission mating contact, and the locking element adjustment ramp has a third distance in the circumferential direction from the locking element, wherein the first distance is shorter than the second distance and/or the third distance is shorter than the first distance and/or the second distance.

8. The charging socket according to claim 4, further comprising an electrical changeover switch which electrically decouples the actuator from an on-board electrical system of the motor vehicle when the second angular position is reached and electrically connects it to the electrical mating contact and/or the signal transmission mating contact so that the actuator is supplied by the latter with electrical current for holding the adjusting ring in the second angular position.

9. A power supply arrangement for supplying a motor vehicle with electrical energy via a conductive plug connection, comprising:
   a stationary charging station; and
   a charging socket arranged on board the motor vehicle,
      wherein the charging socket has at least one electrical mating contact for conductively contacting a contact of the charging station and the charging station has a charging plug extendable in the direction of the motor vehicle, wherein the electrical mating contact is displaceably mounted with respect to a central longitudinal axis of the charging socket in the radial direction between a first mating contact position and a second mating contact position different from the first mating contact position,
   wherein the charging socket has an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position, and
   wherein, when the at least one electrical mating contact is in the second mating contact position, the at least one electrical mating contact and the contact of the charging station are configured to conduct electrical energy from the charging station to the charging socket.

10. A method for operating a charging socket for a power supply arrangement for supplying a motor vehicle with electrical energy via a conductive plug connection including a charging socket having at least one electrical mating contact for conductively contacting a contact of a charging station, wherein the electrical mating contact is displaceably mounted with respect to a central longitudinal axis of the charging socket in the radial direction between a first mating contact position and a second mating contact position different from the first mating contact position, and wherein the charging socket has an adjusting ring which is mounted rotatably about the central longitudinal axis and has at least one adjustment ramp which, in a first angular position of the adjusting ring, permits a displacement of the electrical mating contact into the first mating contact position and, in a second angular position of the adjusting ring, pushes the electrical mating contact into the second mating contact position, the method comprising:
   displacing the electrical mating contact in the direction of the second mating contact position, such that the at least one electrical mating contact and the contact of the charging station are configured to conduct electrical energy from the charging station to the charging socket, in order to establish the conductive contacting of the contact by displacing the adjusting ring in the direction of the second angular position.

* * * * *